United States Patent Office 3,341,966
Patented Sept. 19, 1967

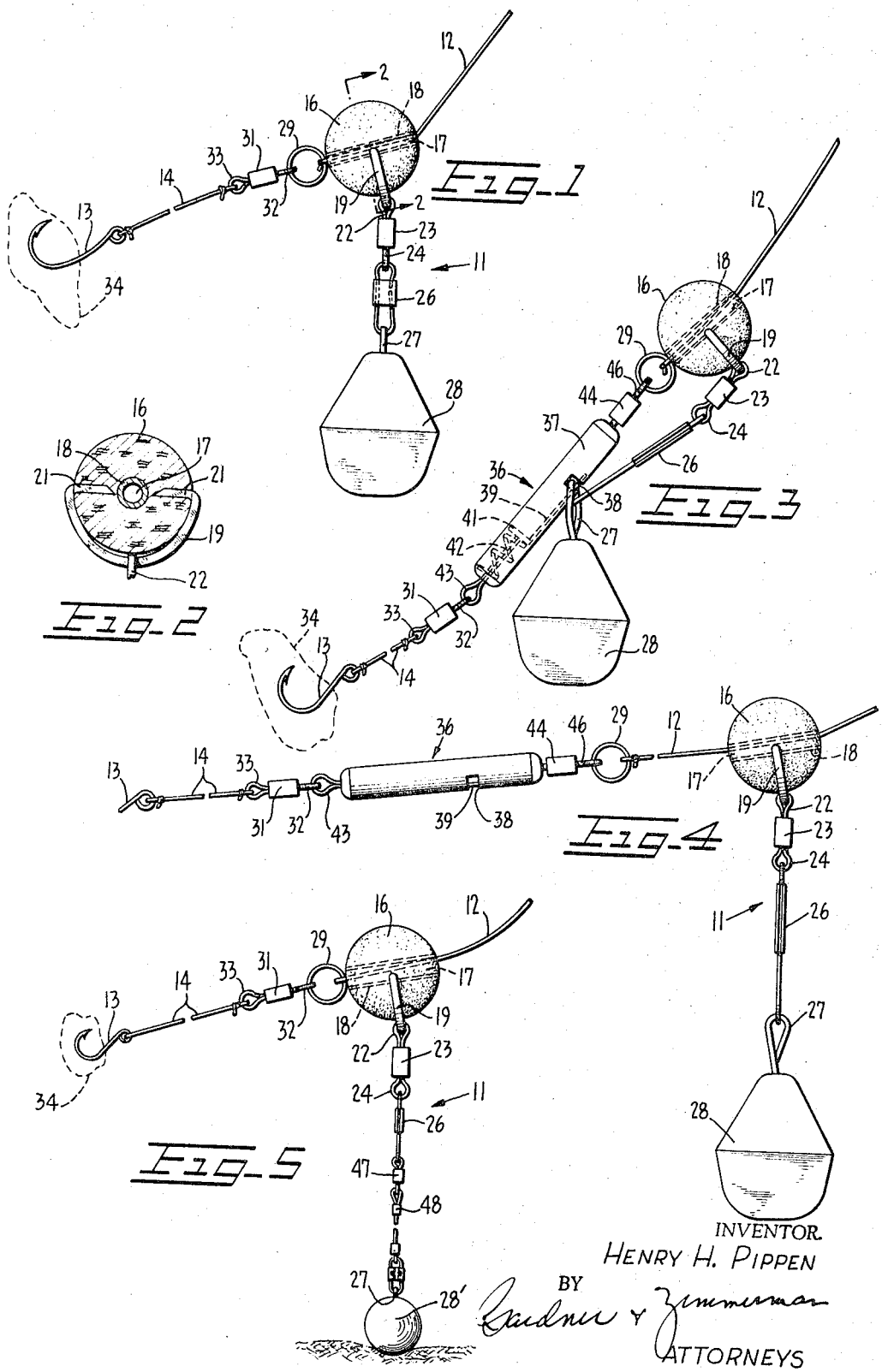

3,341,966
FISHING WEIGHT ASSEMBLY
Henry H. Pippen, San Lorenzo, Calif.
(24252 Broadmore Ave., Hayward, Calif. 94544)
Filed Feb. 3, 1965, Ser. No. 430,042
2 Claims. (Cl. 43—43.15)

This invention relates to fishing tackle and, more particularly, to an improved fishing weight assembly which is advantageous in both trolling and still fishing, and in both deep sea and fresh water fishing.

In deep sea fishing as well as many types of fresh water fishing, it is usual to attach a weight or sinker to the fish line near the hook in order to sink the hook. Such weights are relatively heavy. For example, it is common to use about a three pound weight for deep sea salmon fishing. While, such a sinker accomplishes its purpose of sinking the hook, it has its own disadvantages.

Because of its inertia, such a weight resists sudden jerks or sudden changes in its direction. Thus, when a fish strikes the fish hook, the weight tends to hold the fish hook in its original position. For this reason, before the hook is firmly set in the mouth of the fish it is torn loose therefrom by the weight as the fish swims away. To overcome this, it has become the practice to attach the weight by means of a release mechanism which will release and drop the weight from the fish line when a fish strikes. However, this results in the loss of a weight each time a fish strikes.

It is accordingly an object of this invention to provide an improved weight assembly for a fishing line.

Another object of the invention is to provide a fishing weight assembly which obviates jerking of a hook from the mouth of a fish.

A further object of the invention is to provide a fishing weight assembly which is adapted to be slidably attached to a fishing line.

A still further object of the invention is to provide a fishing weight assembly in which the weight is at a distance from the fish line.

One other object of the present invention is to provide a fishing weight assembly in which the effect of the inertia of the weight on movement of a fish hook with which it is associated is minimized.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to the drawing:

FIGURE 1 is an elevational view depicting a portion of a fish line with a hook thereon, and having a preferred embodiment of the weight assembly of the invention in combination therewith.

FIGURE 2 is a sectional view of a portion of the weight assembly of FIGURE 1 taken on a plane indicated by the line 2—2 and looking in the direction of the arrows.

FIGURE 3 is an elevational view depicting a portion of a fish line with a hook thereon and having in combination therewith another preferred embodiment of the weight assembly of the invention.

FIGURE 4 is another elevation view of the combination of FIGURE 3 depicting the same after a fish has struck the hook.

FIGURE 5 is an elevational view of a weight assembly of the invention as adapted for use in fresh water still fishing.

Briefly, the invention includes a weight assembly for a fish line in which the fish line is adapted to be freely movable with respect to the weight. More particularly, the weight assembly is slidably attached to the fish line, and the fish line is spaced a distance from the weight of the weight assembly and has free rotational movement with respect to such weight. As will be more fully explained hereinafter, because of the above, the inertia of the weight does not affect movement of the fish hook should it be suddenly jerked, such as when a fish strikes it.

For a more detailed description of the invention reference is made to FIGURE 1. A weight assembly of the invention, generally designated by the reference numeral 11, is shown in combination with a fish line 12 having a fish hook 13 suitably attached thereto by means of a leader 14. Weight assembly 11 includes a relatively light or non-weight member such as ball 16 which is adapted to be slidably attached to fish line 12. More particularly, ball 16 has a passage 17 extending therethrough and through which fish line 12 extends. Ball 16 has a spherical shape and passage 17 is diametrically therethrough for reasons which will become apparent hereinafter, and said ball 16 can be of any suitable material which has a density less than or not appreciably greater than water so that ball 16 itself does not act as a weight to submerge line 12. In this embodiment, for economical reasons, ball 16 is of cork and in fact is a conventional cork float. Passage 17 is formed therein by piercing the cork such as by an awl, and inserting a tube 18 therethrough which is of a suitable material such as plastic.

Means are provided on ball 16 by which the remainder of weight assembly 11 is connected thereto. More particularly, as depicted in FIGURE 2, a semicircular ring 19 is peripherally disposed about ball 16 and has two inwardly directed prongs 21 projecting into the ball to fasten such ring thereto. Ring 19 extends through an eye 22 on one end of a first swivel 23 to thereby fasten such swivel to ball 16. Swivel 23 has another eye 24 at the end which is opposite the end having eye 22. One end of a clasp fastener 26 passes through eye 24, while the other end of such fastener passes through an eye 27 on a weight 28 to thereby detachably secure weight 28 to swivel 23. Eyes 22 and 24 of swivel 23 each has an internal diameter which is greater than the cross sectional diameter of the portions of ring 19 and fastener 26 respectively passing therethrough so that ball 16, swivel 23 and fastener 26 are capable of angular movement with respect to each other. Swivel 23 and clip fastener 26 are of a conventional nature. Eyes 22 and 24 of swivel 23 can freely swivel with respect to each other about the longitudinal axis of the swivel, and fastener 26 can be unclasped to permit various sized weights to be attached thereto.

From the above it is seen that weight 28 is positioned a distance away from fish line 12 and by means of ball 16 is slidably attached to such fish line. In addition, it is seen that such weight 28 is detachably secured to ball 16 through a linkage mechanism which permits free rotational movement of ball 16 with respect to such weight. That is, ball 16 can rotate about a diametrical axis transverse to tube 18 without affecting such weight and can move angularly about eye 27 of such weight. As will be seen, these features of the weight assembly prevent hook 13 from being pulled from the mouth of a fish after such fish strikes the hook.

Fish line 12 passes through tube 18 in ball 16 and has a ring 29 suitably secured to its end such as by tying. Ring 29 has a diameter which is greater than the interior diameter or width of tube 18 and thus cannot pass therethrough and acts as a stop to prevent weight assembly 11 from sliding from fish line 12 onto hook 13. A second swivel 31 is attached to ring 29 by such ring passing through an eye 32 at one end of such swivel. Swivel 31 can be similar to swivel 23 and the interior diameter of eye 32 is greater than the cross sectional diameter of ring 29 so that swivel 31 is freely movable on such ring. Leader 14 is suitably attached, such as by tying to an eye 33 at the opposite end of swivel 31. Thus hook 13 is attached to fish line 12 by means of leader 14 through swivel 31 and ring 29.

It is readily apparent from the above how easily weight assembly 11 is attached to line 12. The end of such line is simply fed through tube 18 in ball 16 and tied to ring 29. When so attached, the weight assembly is freely slidable along such line, but cannot become detached therefrom. If the desired weight 28 is not already on the weight assembly, fastener 26 can be unclasped and the desired weight added thereto. While only one weight 28 is shown attached to fastener 26, it is to be appreciated that several weights can be attached thereto in order to provide a desired weight.

The manner in which the weight assembly 11 is used in fishing and how such fishing weight assembly obviates pulling the hook from a striking fish's mouth will now be described. If weight assembly 11 is used in cast fishing, during a cast, ball 16 abuts against ring 29 and thus weight assembly 11 is at the outermost extent of line 12 and insures that hook 13 is carried to the outermost extent of the cast. Similarly, ball 16 abuts against ring 29 if the line hook and weight assembly are dropped into the water and thereby assures that the hook is brought down to substantially the same depth as the weight. During trolling, resistance of movement of the weight assembly through the water maintains ball 16 against ring 29 and thus the weight assembly does not slide along line 12 and thereby fail to maintain hook 13 at the desired depth.

During casting or before the hook and weight are dropped into the water, leader 14 and hook 13 might get tangled with the weight assembly. However, because of the provision of both swivel 31 and swivel 23, it has been found that water flowing by the weight assembly and hook such as when line 12 is pulled through the water, the water readily untangles the hook and leader from the weight assembly so that they take on the position shown in FIGURE 1.

A piece of bait is schematically illustrated at 34 on hook 13. The type of bait used will, of course, depend on the type of fish being sought. It is to be appreciated that a lure having a hook can be substituted for hook 13 and bait 34, if desired. A fish striking either bait 34 or a lure will have hook 13 partially embedded in its mouth. Such a fish will then rapidly swim away. As stated before, if a weight is rigidly attached to line 12, such a weight, because of its inertia, will tear the hook from the mouth of the fish. However, with the present invention, the weight 28 need not be moved. That is, as the fish swims away, it pulls line 12 through the tube 18 in ball 16 and thus can swim away with the hook without having to move the weight.

Some fish strike bait very hard and fast. If such a hard striking fish should strike bait 34 from the side or rear such as in a direction transverse to the drawing, it is possible that there be a tendency for an instantaneous pull or jerk on the fish line before line 12 has a chance to begin to feed through ball 16. However, the present invention obviates any such instantaneous pull. Specifically, because of swivel 23, ball 16 is free to rotate in the direction of the movement of the bait. That is, if a fish is travelling fast in a direction from the rear of the bait 34 and such fish should strike such bait, ball 16 which, as stated before, is relatively light, can rotate about a diametrical axis transverse to passage 17 in a direction to facilitate movement of the hook and bait in the direction of movement of the fish and to prevent binding of the line 12 within tube 18. Because ball 16 is spherical and passage 17 is diametrically therethrough such rotational movement meets with only a minimum of resistance due to the water surrounding it. If a weight itself was slidably attached to the fish line, the inertia of such weight would prevent it from instantaneously rotating as ball 16 rotates, and thus there is apt to be binding and pull on the fish line before such line could begin to feed through such a weight.

The fact that weight 28 is at a distance from line 12 also obviates the possibility of there being an instantaneous jerk on the fish line before such fish line begins to feed through tube 18 in ball 16. That is, because of such distance, ball 16 can move a distance in the direction of movement of the fish without weight 28 having to move except in the rare case when a fish strikes directly upward. This is so because ball 16 can move angularly with respect to weight 28 with eye 27 being the center of rotation. Thus, if a fish should strike bait 13 from any direction except from directly below, ball 16 can move some distance in the direction of movement of the fish. Such movement is sufficient to prevent a sudden jerk on the line before the line 12 begins to feed through the ball 16.

From the above, it is apparent that the improved weight assembly of the invention obviates jerking of a fish hook from the mouth of a fish before the fish hook is firmly set yet does not have to be released from the fish line in order to do so. Besides preventing the loss of a weight each time a fish strikes, the keeping of the weight on the fish line after the fish strikes has other advantages. For example, the weight weighs down the line and helps to tire out the fish, thereby reducing the amount of time it takes to land the fish.

Another embodiment of the invention is depicted in FIGURES 3 and 4. Except for the addition of a release mechanism indicated at 36, such embodiment is similar to the previously described embodiment and like parts are referred to by like numerals. Release mechanism 36 is of the type now used to release a weight from a line when a fish strikes the hook and in this embodiment of the invention interconnects ring 29 and swivel 31. Such release mechanism basically comprises a cylinder 37 having a transverse slot 38 therein. As shown in phantom in FIGURE 3, a pin 39 is within cylinder 37 and extends longitudinally thereof. Such pin is rigidly connected at one of its ends to a disc 41, extends across slot 38 and terminates at the other side of such slot. Disc 41 has a rod 42 attached to the side thereof opposite the side to which pin 39 is connected which extends out one end of cylinder 37 and has an eye 43 exterior of such cylinder. A spring 44 is positioned between disc 41 and the end of cylinder 37 through which rod 42 extends to normally maintain disc 41 at a predetermined distance from such end at which distance pin 39 extends across a slot 38. Upon an outward pull on eye 43, spring 42 will compress end disc 41 and thus pin 39 will move toward the aforesaid end of cylinder 37 and such pin will be moved from its position across slot 38.

Eye 43 is attached to eye 32 of swivel 31, which swivel is attached through leader 14 to hook 13 as in the previously described embodiment. The end of release mechanism 36 opposite the end having an eye 43 has a swivel 44 as a part thereof. Such swivel 44 has an eye 46 which is attached to ring 29 which in turn is suitably attached to line 12 having ball 16 slidably attached thereto. Thus release mechanism 36, with the other previously described connecting parts, interconnects hook 13 with line 12.

This embodiment of the invention obviates pulling of the hook from the mouth of a striking fish in essentially the same manner as the previously described embodiment. However, in this embodiment, weight 28, besides being attached to ball 16 through the previously described linkage mechanism, is attached to release mechanism 36. That is, pin 39 is pulled from across slot 38, eye 27 of weight 28 is inserted into such slot, and pin 39 then is allowed to pass through such eye and across slot 38 to thereby attach such weight to the release mechanism.

When a fish strikes hook 13, the hook will be partially embedded in the mouth of the fish and as the fish swims away, movement of hook 13 therewith will pull eye 43 outward from cylinder 37, and therefore pull pin 39 from across slot 38. Weight 28 will thus be released from release mechanism 36. At the time weight 28 is released, there is slack in the linkage connecting it to ball 16. Thus this embodiment provides the advantages of ball 16 being freely movable at such time, and there is essentially no weight hanging from such ball to provide friction between tube 18 and line 12 passing therethrough. Thus line 12 readily feeds through ball 16 at such time and the hook is not torn from the fish's mouth. It is to be appreciated that because of the relatively high density of water, weight 28 does not descend rapidly enough through the water when it is released to cause an appreciable pull or jerk on line 12 when the linkage between the weight and ball is drawn taut. FIGURE 4 depicts the weight after it has been released and after the aforesaid linkage has become taut. Line 12 is shown broken in this figure between ring 29 and ball 16 to indicate that ball 16 is at an appreciable distance from such ring when the weight assembly reaches the configuration depicted.

FIGURE 5 illustrates a weight assembly of the invention as adapted for use in still-fishing in a river or the like wherein it is desired to maintain hook 13 a predetermined distance from the bed of the body of water. This embodiment of the invention is also similar to the embodiment of FIGURES 1 and 2 and like parts are referred to by like numerals. However, additional linkage, such as swivel and fasteners indicated at 47 and 48, respectively, is provided interconnecting fastener 26 and the eye 27 of a weight in order to lengthen the distance between ball 16 and such weight to the distance that it is desired the hook be above the water bed. While it is not necessary in the previously described embodiments, ball 16 in this embodiment must be of a floating material such as the cork as previously described. Further, the weight indicated at 28' need only be heavy enough to overcome the tendency of ball 16 to rise at the desired depth and prevent the current from carrying the weight assembly and line downstream. Thus, weight 28' can be smaller, as shown, than the weight 28 of the previously described embodiments.

The weight assembly of this embodiment also obviates jerking of a hook 13 from the mouth of a fish. The weight assembly, hook and line are cast or otherwise placed in the water at the desired fishing place. The weight 28' sinks to the bottom and pulls float ball 16 with line 12 passing therethrough down to the desired depth. As described with respect to the embodiment of FIGURE 1 because of swivels 23 and 31, the current will untangle leader 14 and hook 13 from the weight assembly if they should be so tangled. Leader 14 and hook 13 will then extend laterally from ball 16 due to such current.

While the weight assembly of this embodiment maintains the hook and line at the desired depth, it is to be appreciated that it does not place any weight at all on such line. Thus line 12 can freely pass through tube 18 when a fish strikes hook 13. Further, ball 16 has complete freedom to rotate to prevent binding of the line 12 should a fish strike hook 13 from the rear or the side. These advantages are especially important in fresh water still fishing wherein the fish are generally smaller and it takes only a slight pull or jerk to pull the fish hook from the mouth of the fish.

What is claimed is:

1. A fishing weight assembly for attachment to a fish line comprising a weight, a substantially spherical member having a passage extending diametrically therethrough and adapted to slidably receive a fish line, and linkage interconnecting said member and said weight spacing said member and said weight a distance apart and allowing free rotational movement of said member with respect to said weight, said linkage including a swivel for rotation of said member with respect to said weight about a diametrical axis transverse to said passage.

2. Fishing tackle comprising a fish line; a weight assembly slidably attached to said fish line and including a weight, a substantially spherical member having a passage extending diametrically therethrough and through which fish line slidably extends, and linkage interconnecting said weight and said member allowing free rotational movement of said member with respect to said weight, said linkage including a first swivel for rotation of said member with respect to said weight about a diametrical axis transverse to said passage and a clasp fastener for detachably securing said weight to said member; a ring secured to said fish line at an end thereof having a diameter greater than the width of said passage in said member to prevent said member from sliding from said fish line at said end; and a fish hook secured to said ring through a second swivel allowing rotation of said fish hook with respect to said fish line.

References Cited

UNITED STATES PATENTS

| | | | |
|---|---|---|---|
| 1,315,408 | 9/1919 | Rabbeth | 43—42.05 |
| 2,680,928 | 6/1954 | Silva | 43—43.12 |
| 2,779,122 | 1/1957 | De Groff | 43—44.9 |
| 2,932,115 | 4/1960 | Dunn | 43—43.12 |
| 3,120,715 | 2/1964 | Long | 43—43.1 |

SAMUEL KOREN, *Primary Examiner.*

D. J. LEACH, *Assistant Examiner.*